(12) United States Patent
Karpisek

(10) Patent No.: US 6,478,182 B2
(45) Date of Patent: Nov. 12, 2002

(54) INSPECTION SIDE PANEL FOR A CONTAINER

(76) Inventor: Ladislav Stephan Karpisek, 86 Woodfield Boulevarde, Caringbah, New South Wales 2229 (AU)

( * ) Notice: Subject to any disclaimer, the term of this patent is extended or adjusted under 35 U.S.C. 154(b) by 0 days.

(21) Appl. No.: 09/798,579

(22) Filed: Mar. 2, 2001

(65) Prior Publication Data

US 2001/0007307 A1 Jul. 12, 2001

Related U.S. Application Data

(63) Continuation-in-part of application No. 09/463,887, filed as application No. PCT/AU98/00522 on Jul. 7, 1998, now abandoned.

(30) Foreign Application Priority Data

Jul. 29, 1997 (AU) .............................................. P08276

(51) Int. Cl.[7] .......................... B65D 25/54; B65D 90/04
(52) U.S. Cl. ........................ 220/662; 206/386; 220/1.5; 220/495.05; 220/495.06
(58) Field of Search .......................... 206/386; 220/1.5, 220/1.6, 23.91, 495.01, 495.05, 495.06, 661–663; 222/95, 105; 229/117.3, 162

(56) References Cited

U.S. PATENT DOCUMENTS

| | | | | |
|---|---|---|---|---|
| 1,411,475 A | * | 4/1922 | Brooks et al. ............... | 220/662 |
| 3,205,764 A | * | 9/1965 | Letter .......................... | 220/662 |
| 3,453,033 A | * | 7/1969 | Goss ...................... | 220/495.05 |
| 5,085,346 A | * | 2/1992 | Wright ....................... | 222/183 |
| 5,680,955 A | * | 10/1997 | Schutz ....................... | 220/1.5 |
| 5,730,307 A | * | 3/1998 | Karpisek .................... | 220/1.5 |
| 5,799,818 A | * | 9/1998 | Ringer ...................... | 229/117 |
| 5,826,752 A | * | 10/1998 | Latimer .................... | 222/105 |

FOREIGN PATENT DOCUMENTS

| | | |
|---|---|---|
| AU | 81224/75 | 11/1976 |
| AU | 26075/84 | 10/1984 |
| AU | 75987/94 A | 5/1995 |
| DE | 297 00 436 U1 | 9/1997 |
| FR | 2551728 * | 3/1985 .............. 220/62.11 |
| FR | 2709826 | 3/1995 |

* cited by examiner

Primary Examiner—Bryon P. Gehman
(74) Attorney, Agent, or Firm—Edwin D. Schindler

(57) ABSTRACT

A rectangular inspection side panel for a container for housing a clear plastic liner bag for holding a liquid, with the rectangular inspection side panel including a segment extending substantially the entire height of the rectangular inspection side panel and being sufficiently transparent for allowing a level of a liquid in a clear plastic liner bag to be visible. The segment is able to be moved and is mounted in the rectangular inspection side panel for allowing replacement of the segment. A perimeter frame having two elongated side members is joined at respective ends by upper and lower edge members with a covering fixed to the perimeter frame and having an opaque covering sheet covering a majority portion of the perimeter frame with the segment covering the remainder of the perimeter frame.

31 Claims, 4 Drawing Sheets

… … … … … … … …

INSPECTION SIDE PANEL FOR A CONTAINER

This is a continuation-in-part of application Ser. No. 09/463,887, filed Jan. 31, 2000, as the U.S. National Phase application, pursuant to 35 U.S.C. §371, of P.C.T. Application No. PCT/AU98/00522, filed Jul. 7, 1998, now abandoned.

FIELD OF INVENTION

This invention relates to means for monitoring the liquid level in a container.

BACKGROUND TO THE INVENTION

A common form of container for the storage and transport of liquid is one in which there is a pallet type base on which there is mounted four interlocked side panels. The side panels are typically metal frames covered with an opaque plastic sheet material which incorporates a UV inhibitor. The side panels can be demountable from the base or can be hinged thereto so that the side panels can fold down over each other and over the base. The side panels when erected on the base provide an open topped enclosure for a clear plastic film liner bag. The word "clear" in the context of the present invention means a plastic liner sufficiently transparent to allow the level of liquid housed in the bag to be seen. A lid is provided for the open top of the container. Discharge is by gravity through a nozzle of the liner big which projects through an opening in one side panel of the container at an elevation slightly above the bag supporting upper face of the base of the container. The nozzle is adapted for the connection of a valve and a discharge pipe.

In use, means to readily ascertain the amount of liquid in the liner big in the container at any one time is desirable. This can be done by knowing the amount of liquid in the container before emptying, measuring the amount discharged and subtracting the latter from the former. Another method is to use a dip stick through the filler nozzle in the top of the liner bag.

Neither method readily provides the information required. It is also desirable to know what liquid is in the liner bag, eg. hazardous, benign, acidic, alkaline, etc.

The present invention proposes the inclusion of a "window" in a side of the container which may carry indicia to accurately indicate the quantity of liquid in the liner bag. By means of a coding system, for example colour coding, the nature of the liquid in the liner bag can be readily determined. To allow ready changeover of the window, to allow for different indicia or colour coding, or to allow replacement of the window in the case of damage, the window is made readily removable from the container side.

For practical reasons, it is not possible where plastic sheet material is used to cover the frames of the side panels to make that plastic transparent to act as a window, One reason is that it would be too difficult to have a whole side covering sheet readily removable. Another reason is that where plastic sheet material is used to cover the container sides economics dictates that the sheet must be of low cost and such low cost plastic sheet material requires a UV inhibitor because the containers are often placed in positions where they are exposed to sunlight. If the UV inhibitor was to be added to a clear plastic sheet of conventional (cost effective) material the sheet material would be rendered translucent thereby making it useless as a means for observing the liquid level in the film bag in the container. Some plastics, such as polycarbonate and PETG, can withstand UV effects whilst remaining substantially transparent such material is however too expensive to use to completely cover the frames of the container side panels. The present invention addresses the above requirements in a simple and economic manner.

BROAD STATEMENT OF THE INVENTION

Broadly stated the invention can be said to provide an inspection side panel for a container to house a clear plastic liner bag adapted to hold a liquid, said side panel including a segment extending for substantially the whole height of the said side panel, the segment is readily removable in order to allow replacement and is substantially transparent.

In another, specific, form the invention provides an inspection side panel for a container, where said side panel includes a demountable substantially transparent UV ray resistant sheet plastic inspection segment extending for substantially the whole height of the said side panel, where the segment is adapted for use in combination with three other side panels and a base to form a container to house a clear plastic liner bag for liquid, wherein the base is a rectangle with two plinths of the same height upstanding from a support surface of the base along two opposed side edges of the base, said side panels being arranged in pairs with one pair shorter than the other by the amount that top edges of the plinths stand above the base support surface, the shorter side panels are respectively coupled to said plinths so as to be able to be moved between overlying relationship over said base and an upright condition relative to the base and the taller side panels one of which includes said inspection segment are respectively coupled each to both plinths at the other side edges of said base so as to be able to be moved between overlying relationship over said base and an upright condition relative to the base and releasable securing means is provided to secure together adjacent side panels when upright relative to the base.

More specifically, the invention can be said to provide an inspection side panel for a container, where said side panel includes a demountable transparent inspection segment extending for substantially the whole height of the said side panel, in combination with other side panels and a base to form a container to house a clear plastic liner bag for liquid, where all the side panels are of substantially the same height and are adapted with the base to allow the side panels to be mounted on and demounted from the base releasable securing means is provided to secure together adjacent side panels mounted on the base.

The facility of ready replacement of the segment allows the versatility of the container to be improved. Not only can the segment be easily replaced if damaged, substitution of the segment by a segment of having unique characteristics to suit use requirement is possible. For example, segments having graduations of different types (metric volumetric measure or imperial volumetric measure) are possible. Different scales of graduation are possible, "full", "¾ full", "½ full", "zero", would be an example, as distinct from "1000 litres", "900 litres", etc. being the other possibility. Colour coded segments to indicate the nature of the liquid in the liner bag (hazardous, benign, acidic, alkaline, etc.) are possible. Coloured segments to protect light sensitive liquid in the liner bag are possible.

DETAILED DESCRIPTION OF THE DRAWINGS

Figure 1:
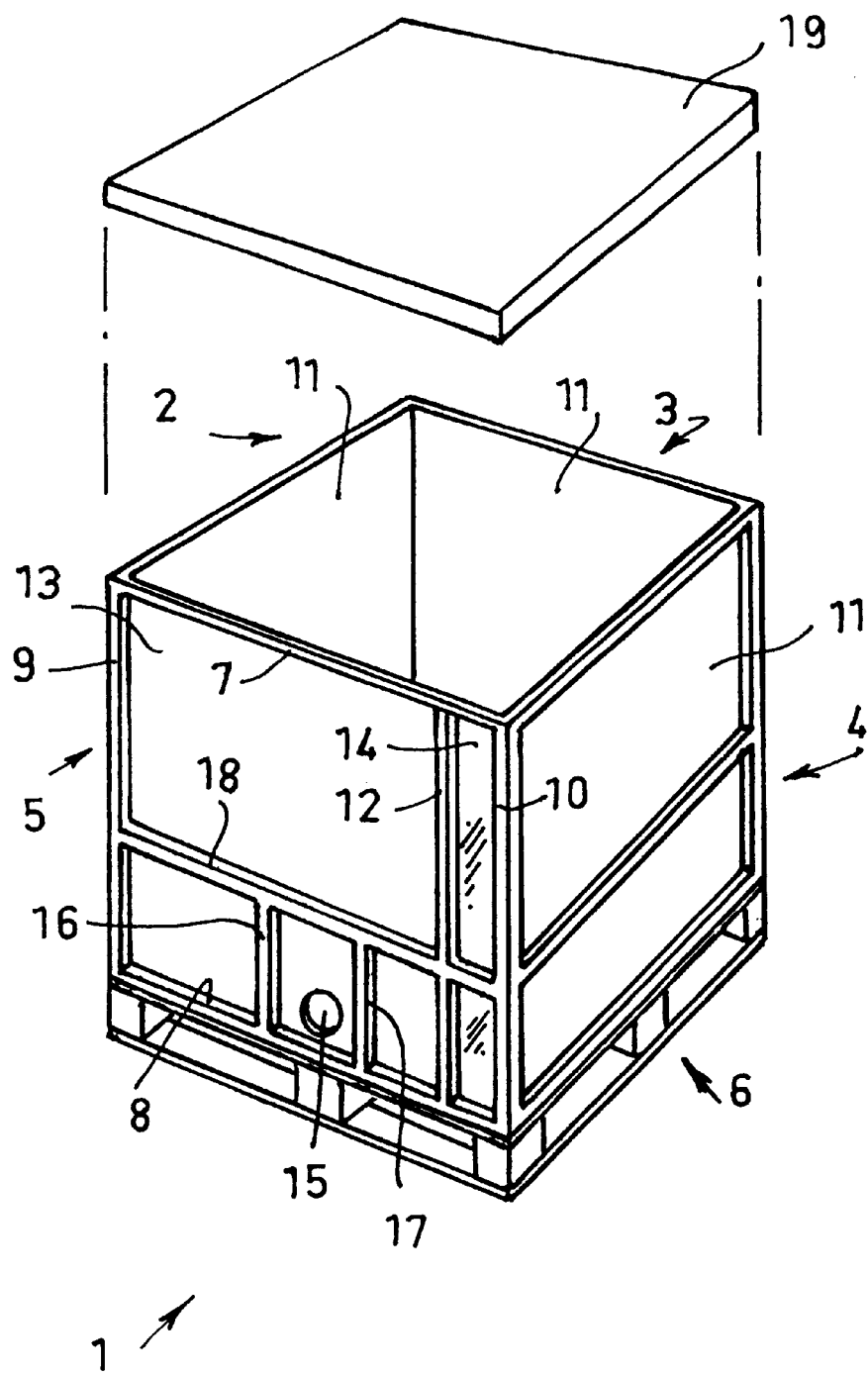
FIG. 1 is a schematic illustration of a first form of container with which the inspection container side of this invention is associated.

In FIG. 1 there is shown a container indicated 1 with four side panels 2,3,4,5 and a base 6 of pallet type typically allowing access of fork lift truck tines from all four sides of the base. The side panels 2 to 5 are demountably secured to the base in any one of a number of ways, examples are disclosed in Australian patents numbered 665635 and 684859 by the present applicant. The side panels 2 to 5 are all of the same general construction comprising a frame of angle iron with a top rail 7, a bottom rail 8 and side posts 9 and 10 connecting the top and bottom rails.

The container side 5 is a inspection side panel in accordance with the present invention and it differs from the other side panels in that is does not have all of the inner face of the panel forming frame covered with an opaque covering sheet 11, as is the case with the side panels 2,3 and 4. In the case of the side panel 5, there is a supplemental post 12 spaced closely to the post 10 with the area defined by the supplemental post 12 and the post 9 and the top and bottom rails there between covered by a covering sheet 13 and the area defined by the supplemental post 12 and the post 10 and the top and bottom rail there between covered by a transparent segment being a panel of plastic 14 selected from the group consisting of polycarbonate or PETG. For practical reasons, e.g. cost, ease of removal and replacement, (as will be hereinafter discussed) and need to perform its required task, the width of the segment 14 is considerably less than the width of the panel 5. A preferred relationship of widths, that is segment width compared with panel width, would be where the segment width is between 1% and 15% of the width of the panel 5.

Figure 4:
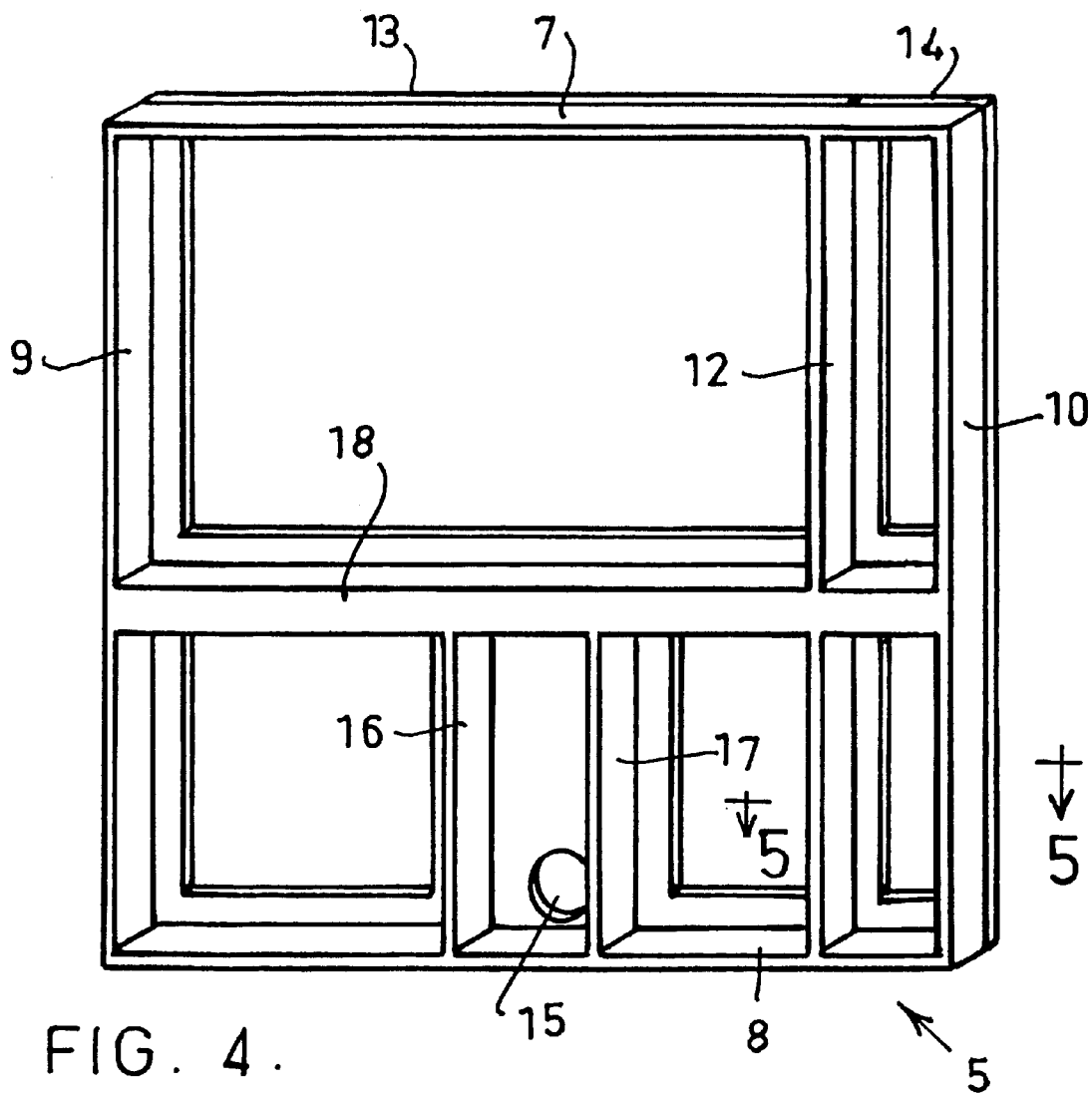
FIG. 4 is a perspective view of a container side of the form illustrated in FIGS. 1 and 2.
Figure 8:
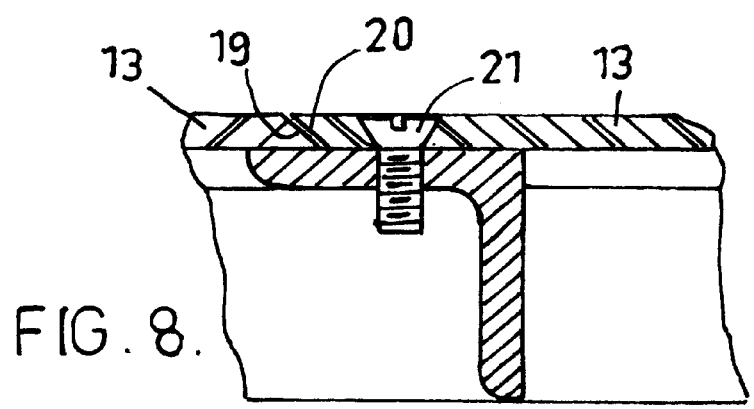
FIG. 8 is an enlarged fragmentary view of the zone circled and marked "A" in FIG. 6.

There is an opening 15 in the covering sheet 13 adjacent the bottom rail 8 of the inspection side panel 5 to allow the discharge nozzle of a clear plastic liner bag housed in the container to extend beyond the inspection panel 5. The opening 15 lies in a zone of the covering sheet 13 defined by bars 16,17, an intermediate rail 18 and the bottom rail 8 of the inspection panel. This zone may include a nozzle retainer and is usually covered by a door to provide protection for the nozzle. All of the features just described can be seen in detail in FIG. 4.

Figure 2:
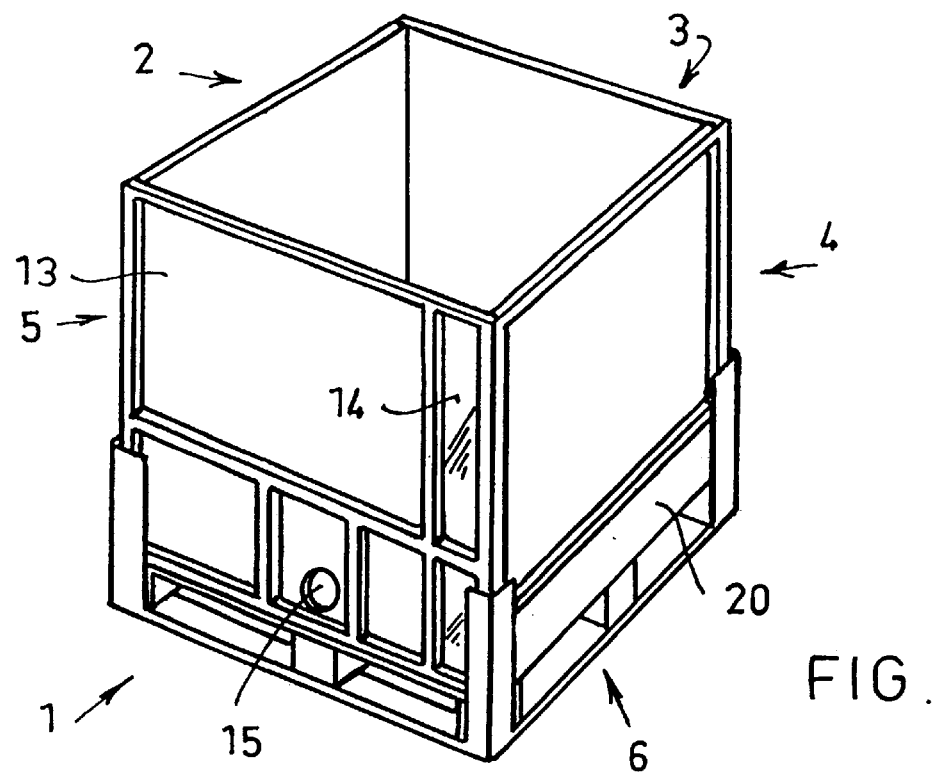
FIG. 2 is a schematic illustration of a second form of container with which the inspection container side of this invention is associated.

In FIG. 2 there is shown a second form of container using an inspection panel of the invention. In this container the base 6 has two plinths 20 upstanding from the top face of the base and the side panels 3 and 5 are taller than the side panels 2 and 4. All four side panels are hingedly connected to the base allowing the taller sides to fold down one over the other and both over the base, followed by the shorter side panels which are likewise able to fold down and be erected to form sides for the container. The hinge connection between the four panel sides and the base can be of any suitable type but one arrangement is as shown in Australian patent number 676087 by the present applicant.

Figure 3:
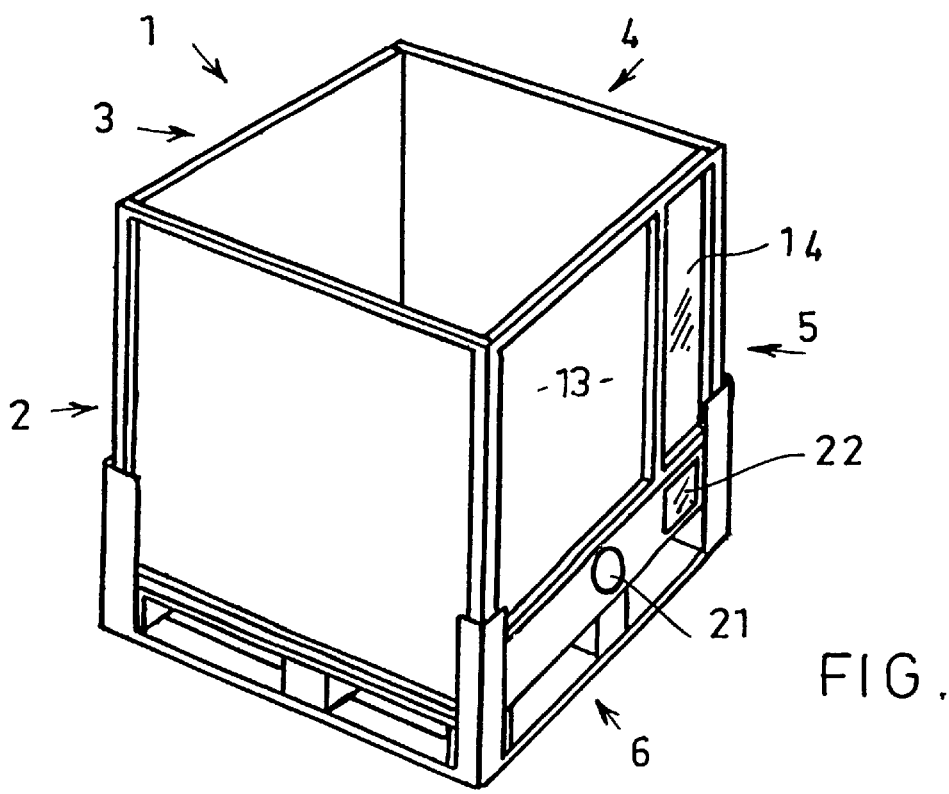
FIG. 3 is a schematic illustration of a third form of container with which the inspection container side of this invention is associated.

FIG. 3 shows a variation of the arrangement shown in FIG. 2. In this arrangement the inspection panel is one of the short panels pivotally connected to the plinth 20, but it does not have a nozzle opening. There is a nozzle opening but it is located in the plinth 20 and is indicated 21. There is an inspection zone or window 22 provided in the plinth 20 to complement the inspection segment 14 of the inspection side panel 5. By means of the inspection segment 14 and the inspection window 23 the level of the liquid in the plastic liner bag in the container can be monitored until the liner bag is empty.

It is to be understood that the inspection segment 14 has been representatively illustrated as being at one side of the inspection panel 5, and that the inspection segment 14 can be mounted in a position other than that illustrated. It is also to be understood that it is desirable, but not essential, for the inspection panel 5 to have or be disposed adjacent to an aperture allowing access to a liner bag nozzle from outside the container.

Figure 5:
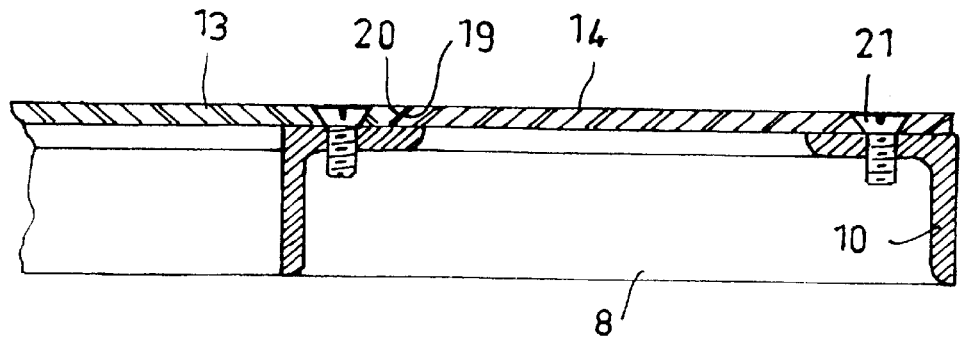
FIG. 5 is an enlarged sectional view on the section line 5—5 of FIG. 4 illustrating one manner of demountably securing a transparent inspection segment in the container side.

From sectional view FIG. 5, which illustrates a first method of mounting the segment in the container, is will be seen the segment 14 has one edge angled at 19 to lie below a corresponding angled edge 20 of the sheet 13. Securing screws 21 through the segment 14 and into the leg of the angle iron member 10 provide a ready means for holding the segment in place and allowing it to be readily removed for replacement. As the segment 14 is forced against the legs of the frame of the side panel 5 by the pressure of the liquid in the liner bag the number of securing screws 21 can be minimal.

Figure 6:
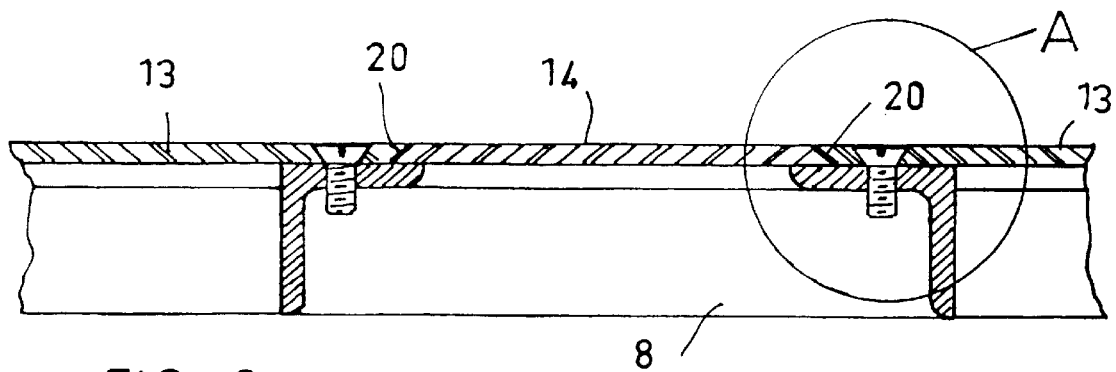
FIG. 6 is an enlarged sectional view on the section line 5—5 of FIG. 4 illustrating a second manner of demountably securing a transparent inspection segment in the container side.

FIG. 6 illustrates an arrangement where the segment 14 is not located at the edge of the frame of the side panel 5. In this arrangement two portions of the sheet 13 are angled at 20 and overlie side panel members 24, 25. The angled edges 20 of the sheet 13 also overlie angled edges of the segment 14 supported by the panel members 24, 25. In this arrangement the segment 14 can be slid longitudinally down the "dovetail" between the sheet 13 portions where is can be simply secured against unwanted movement by a single screw (not shown) into the panel frame top member 7 or bottom member 8.

Figure 7:
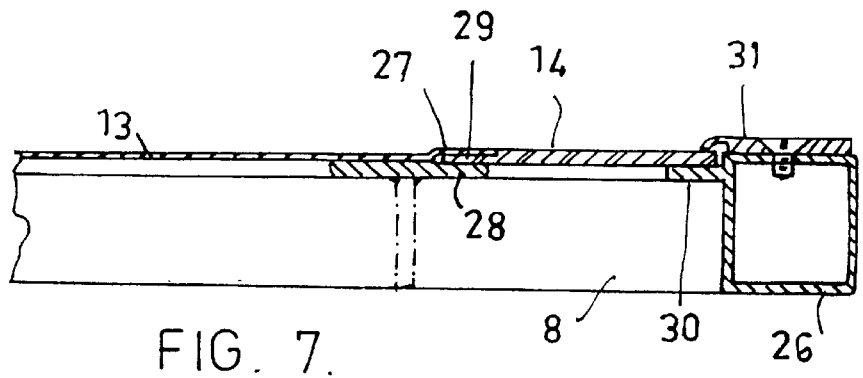
FIG. 7 is an enlarged sectional view on the section line 5—5 of FIG. 4 illustrating a further manner of demountably securing a transparent inspection segment in the container side.

In FIG. 7, a further arrangement is illustrated wherein the segment 14 is clamped in place. In this arrangement the sheet 13 is thin sheet metal and the frame of the side panel 5 is made of tubular steel, a frame side member 26 corresponds with the angle frame side member 10 of FIG. 1. The metal sheet 13 with a joggled edge 27 to form with the frame member 28 (which may be of T form as shown in broken lines) a channel to accept one long rebated edge zone 29 of the segment 14. The other edge of the segment 14 overlies a flange 30 on the side member 26 against which it is clamped by clamp member 3.

In all of the foregoing the arrangement is such as to provide a substantially continuous and smooth supporting surface against which the liner bag will press when filled with liquid. It follows that an observation can be readily made of the height of the liquid in the liner bag in the container through the transparent inspection segment 14 and the clear plastic of the liner bag in the container.

The container of FIG. 1 would conventionally have a lid 19. The manner in which the four side panels are interconnected can vary but one arrangement is shown in Australian patent number 684859 by the present applicant.

I claim:

1. A rectangular inspection side panel for a container for housing a clear plastic liner bag for holding a liquid, said rectangular inspection side panel comprising:

a segment extending substantially the entire height of said rectangular inspection side panel and being sufficiently transparent for allowing a level of a liquid in a clear plastic liner bag to be visible, said segment being movably mounted in said rectangular inspection side panel for allowing replacement of said segment;

a perimeter frame having two elongated side members joined at respective ends by an upper edge member and a lower edge member; and, a covering fixed to said perimeter frame having an opaque covering sheet covering a majority portion of said perimeter frame with said segment covering a remaining portion of said perimeter frame.

2. The rectangular inspection side panel according to claim 1, wherein said segment is made of a transparent rigid plastic material.

3. The rectangular inspection side panel according to claim 2, wherein said transparent rigid plastic material is a polycarbonate.

4. The rectangular inspection side panel according to claim 2, wherein said transparent rigid plastic material is PETG.

5. The rectangular inspection side panel according to claim 1, wherein said rectangular inspection side panel includes an opening at, or adjacent said bottom edge of, said rectangular inspection side panel for allowing a liquid discharge nozzle of a liner bag housed in said container.

6. The rectangular inspection side panel according to claim 1, wherein said perimeter frame includes a top rail and a bottom rail joined at corresponding ends by side posts with a supplemental post adjacent a first side post of said side posts and end fixed to said top rail and said bottom rail, said opaque covering sheet extending over an area bounded by said supplemental post and a second side post of said side posts with said top rail and said bottom rail extending therebetween, said segment extending over an area bounded by said supplemental post and said first side post and said top rail and said bottom rail extending therebetween with said opaque covering sheet and said segment of aid rectangular side panel being substantially coplanar.

7. The rectangular inspection side panel according to claim 1, in combination with three additional side panels and a base for forming a container for housing a clear plastic liner bag for liquid, wherein said rectangular inspection side panel and said three additional side panels each have a height so that, when erect on said base, top edges of said side panels are substantially coplanar, said side panels being adapted with said base for allowing said side panels to be mounted on, and demounted from, said base, and means for releasably securing together adjacent said side panels mounted so as to be erect on said base.

8. The rectangular inspection side panel according to claim 1, in combination with three additional side panels and a rectangular base for forming a container for housing a clear plastic liner bag for liquid, wherein said rectangular base has two plinths of equal height upstanding from said support surface of said rectangular base along two opposed sides of said rectangular base, said side panels being arranged in pairs with a first pair being shorter than a second pair of said pairs by an amount that top edges of said two plinths stand above said support surface with said bottom edges of said first pair of side panels being respectively coupled by said first couplings to said two plinths for being movable between an overlying relationship over said rectangular base and an upright condition relative to said rectangular base and said bottom edges of said second pair of said panels, one of said overlying relationship or said upright condition including said inspection segment coupled by said first couplings to said rectangular base at remaining sides of said rectangular base, so as to be movable between said overlying relationship over said rectangular base and said upright condition relative to said rectangular base, said second couplings being releasable for allowing movement of said side panels between said overlying relationship and said upright condition.

9. The rectangular inspection side panel according to claim 1, in combination with three additional side panels and a rectangular base for forming a container for housing a clear plastic liner bag for liquid, wherein said rectangular base has two plinths of equal height upstanding from said support surface of said rectangular base along two opposed sides of said rectangular base, said side panels being arranged in pairs with a first pair being shorter than a second pair of said pairs by an amount that top edges of said two plinths stand above said support surface with one of said bottom edges of said first pair of side panels including said demountable inspection segment, said bottom edges of said first pair of side panels being respectively coupled by said first couplings to said rectangular base at remaining sides of said rectangular base, so as to be movable between an overlying relationship over said rectangular base and an upright condition relative to said rectangular base, said second couplings being releasable for allowing movement of said side panels between said overlying relationship and said upright condition.

10. The rectangular inspection side panel according to claim 9, in combination with three additional side panels and a rectangular base for forming a container for housing a clear plastic liner bag for liquid, wherein one plinth of said two plinths includes a transport inspection zone having an opening for allowing a liquid discharge nozzle of a liner bag housed in said container to extend beyond said one plinth of said two plinths.

11. The rectangular inspection side panel according to claim 9, in combination with three additional side panels and a rectangular base for forming a container for housing a clear plastic liner bag for liquid, wherein perimeter frame includes a top rail and a bottom rail joined at corresponding ends by side posts and a supplemental post adjacent to a first side post of said side posts and end fixed to said top rail and said bottom rail, said opaque covering sheet extending over an area bounded by said supplemental post and a second side post of said side posts and said top rail and said bottom rail extending therebetween, said segment extending over an area bounded by said supplemental post and said first side post and said top rail and said bottom rail extending therebetween, with said opaque covering sheet and said segment of said rectangular inspection side panel being substantially coplanar.

12. The rectangular inspection side panel according to claim 1, wherein said segment is a strip of rigid plastic material disposed adjacent one elongated side member of said two elongated side members of said perimeter frame with long edges of said strip being respectively supported by said one elongated side member and a support member spaced from said one elongated side member, said support member being substantially parallel to said one elongated side member and extending between said upper edge member and said lower edge member of said perimeter frame, with end edges of said strip being supported by said upper edge member and said lower edge member of said perimeter frame, with a first long edge of said long edges of said strip supported by said support member being chamfered and engaged under a chamfer on an edge of said opaque covering sheet, said opaque covering sheet also being supported by said support member, and a second long edge of said long edges of said strip being releasably secured to said one elongated side member of said perimeter frame.

13. The rectangular inspection side panel according to claim 1, wherein said segment is a strip of rigid plastic material disposed between two sections of said opaque covering sheet having spaced apart adjacent side edges supported by two support members substantially parallel to said two elongated side members and extending between, and fixed to, said upper edge member and said lower edge member of said perimeter frame, said adjacent side edges of said two sections being chamfered and respectively overlying said two support members for providing a pair of tracks, wherein said adjacent side edges of said strip are engaged for allowing said strip to be slidingly disengaged from said pair of tracks, and means for releasably securing said strip against disengagement.

14. The rectangular inspection side panel according to claim 1, wherein said segment is a strip of rigid plastic material disposed adjacent one elongated side member of said two elongated side members of said perimeter frame with long edges of said strip respectively supported by a flange on said one elongated side member and a support member spaced from said one elongated side member, said support member being substantially parallel to said one elongated side member and extending between said upper edge member and said lower edge member of said perimeter frame, with end edges of said strip being supported by said upper edge member and said lower edge member, a first long edge of said long edges of said strip supported by said support member lies in a track defined by said support member and a retaining lip at an edge of said opaque covering sheet which is supported by said support member, a second long edge of said long edges of said strip being releasably clamped against said flange.

15. The rectangular inspection side panel according to claim 1, wherein said segment is a strip of rigid plastic material having marking, so that an amount of liquid in a liner bag in said container, of which said rectangular inspection panel forms a part of, is able to be determined.

16. The rectangular inspection side panel according to claim 1, wherein said segment has a width of between 1%–15% of a width of said rectangular inspection side panel.

17. A rectangular inspection side panel in combination with a container for housing a clear plastic liner bag for holding a liquid, said combination comprising:
a container comprised of;
a four-sided base with a rectangular inspection side panel and three additional side panels, all of said rectangular inspection side panel and said three additional side panels being upright relative to a support surface for said four-sided base with top edges of said side panels being substantially coplanar;
first couplings between bottom edges of said side panels and respective sides of said four-sided base; and,
second couplings between adjacent side edges of said side panels; and,
a rectangular inspection side panel comprised of:
a perimeter frame providing two side edges and a top edge and a bottom edge for said rectangular inspection side panel;
an opaque covering sheet fixed to said perimeter frame covering a majority portion of said perimeter frame; and,
a demountable inspection segment made of a rigid plastic sufficiently transparent for allowing a level of liquid in a transparent liner bag housed in said container to be seen, said demountable inspection segment covering a remaining portion of said perimeter frame and extending substantially entirely between said bottom edges and said top edges of said side panels of said container.

18. The rectangular inspection side panel in combination with a container for housing a clear plastic liner bag for holding a liquid according to claim 17, wherein said rigid plastic for making said demountable inspection segment is a polycarbonate.

19. The rectangular inspection side panel in combination with a container for housing a clear plastic liner bag for holding a liquid according to claim 17, wherein said rigid plastic for making said demountable inspection segment is PETG.

20. The rectangular inspection side panel in combination with a container for housing a clear plastic liner bag for holding a liquid according to claim 17, wherein said rectangular inspection side panel includes an opening at, or adjacent said bottom edge of, said rectangular inspection side panel for allowing a liquid discharge nozzle of a liner bag housed in said container.

21. The rectangular inspection side panel in combination with a container for housing a clear plastic liner bag for holding a liquid according to claim 17, wherein said four-sided base has two plinths of equal height upstanding from said support surface of said four-sided base along two opposed sides of said four-sided base, said side panels being arranged in pairs with a first pair being shorter than a second pair of said pairs by an amount that top edges of said two plinths stand above said support surface with said bottom edges of said first pair of side panels being respectively coupled by said first couplings to said two plinths for being movable between an overlying relationship over said four-sided base and an upright condition relative to said four-side base and said bottom edges of said second pair of said panels, one of said overlying relationship or said upright condition including said inspection segment coupled by said first couplings to said four-sided base at remaining sides of said four-sided base, so as to be movable between said overlying relationship over said four-sided base and said upright condition relative to said four-sided base, said second couplings being releasable for allowing movement of said side panels between said overlying relationship and said upright condition.

22. The rectangular inspection side panel in combination with a container for housing a clear plastic liner bag for holding a liquid according to claim 17, wherein said four-sided base has two plinths of equal height upstanding from said support surface of said four-sided base along two opposed sides of said four-sided base, said side panels being arranged in pairs with a first pair being shorter than a second pair of said pairs by an amount that top edges of said two plinths stand above said support surface with one of said bottom edges of said first pair of side panels including said demountable inspection segment, said bottom edges of said first pair of side panels being respectively coupled by said first couplings to said four-sided base at remaining sides of said four-sided base, so as to be movable between an overlying relationship over said four-sided base and an upright condition relative to said four-sided base, said second couplings being releasable for allowing movement of said side panels between said overlying relationship and said upright condition.

23. The rectangular inspection side panel in combination with a container for housing a clear plastic liner bag for holding a liquid according to claim 22, wherein one of said two plinths includes a transparent supplemental inspection zone substantially aligned with, and which complements, said demountable inspection segment of said rectangular inspection side panel when upstanding from said four-sided base.

24. The rectangular inspection side panel in combination with a container for housing a clear plastic liner bag for holding a liquid according to claim 23, wherein said one of said two plinths having said transparent supplemental inspection zone includes an opening for allowing a liquid discharge nozzle of a liner bag housed in said container to extend beyond said one plinths having said supplemental inspection zone.

25. The rectangular inspection side panel in combination with a container for housing a clear plastic liner bag for holding a liquid according to claim 17, wherein said second couplings allow said side panels to be mounted and demounted from said four-sided base.

26. The rectangular inspection side panel in combination with a container for housing a clear plastic liner bag for holding a liquid according to claim 17, further comprising a supplemental frame member parallel to, and spaced from, one side edge of said rectangular inspection side panel, said opaque covering sheet extending over said perimeter frame, except for a zone between said side edge of said rectangular inspection panel and said supplemental frame member, said zone being occupied by said demountable inspection segment.

27. The rectangular inspection side panel in combination with a container for housing a clear plastic liner bag for holding a liquid according to claim 26, wherein said demountable inspection segment includes two elongated edges and two end edges, said end edges being respectively supported by said top edge and said bottom edge of said rectangular inspection side panel, a first elongated edge of said two elongated edges being chamfered and overlying part of a width of said supplemental frame member and being engaged under a chamfer on an edge of said opaque covering sheet overlying said part of the width of said supplemental frame member, a second elongated edge of said two elongated edges being releasably secured to said one side edge of said rectangular inspection side panel.

28. The rectangular inspection side panel in combination with a container for housing a clear plastic liner bag for holding a liquid according to claim 26, wherein said demountable inspection segment has a first elongated edge and a second elongated edge and two end edges, said end edges being respectively supported by said top edge and said bottom edge of said rectangular inspection side panel, said first elongated edge of said demountable inspection segment being supported by a flange on one said edge of said perimeter frame of said rectangular inspection side panel and said second elongated edge of said demountable inspection segment being engaged in a track defined by said supplemental frame member and a retaining lip at an edge of said opaque covering sheet supported by said supplemental frame member, and means for releasably clamping said first elongated edge of said demountable inspection segment against said flange.

29. The rectangular inspection side panel in combination with a container for housing a clear plastic liner bag for holding a liquid according to claim 17, wherein said demountable inspection segment is a strip of plastic material disposed between two sections of said opaque covering sheet and having spaced apart adjacent side edges supported by two substantially parallel supplemental frame members parallel to said side edges of said rectangular inspection side panel, said demountable inspection segment having two elongated edges and two end edges respectively supported by said top edges and said bottom edges of said rectangular inspection side panel, said adjacent side edges of said two sections of said opaque covering sheet being chamfered and respectively overlying said two substantially parallel supplemental frame members for providing a pair of tracks for said elongated edges of said demountable inspection segment allowing said demountable inspection segment to be slidingly disengaged from said pair of tracks, and releasable means for securing said demountable inspection segment against disengagement from said pair of tracks.

30. The rectangular inspection side panel in combination with a container for housing a clear plastic liner bag for holding a liquid according to claim 17, wherein said demountable inspection segment includes markings so that an amount of liquid in a liner bag in said container, of which said rectangular inspection side panels forms a part of, is able to be determined.

31. The rectangular inspection side panel in combination with a container for housing a clear plastic liner bag for holding a liquid according to claim 17, wherein said demountable inspection segment has a width of between 1%–15% of a distance between said side edges of said rectangular inspection side panel.

* * * * *